(12) United States Patent
Giesler et al.

(10) Patent No.: US 6,679,678 B2
(45) Date of Patent: Jan. 20, 2004

(54) INCREASED WEAR-LIFE MECHANICAL FACE SEAL ANTI-ROTATION SYSTEM

(75) Inventors: William Giesler, Phoenix, AZ (US); Kellan Geck, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/160,728

(22) Filed: May 31, 2002

(65) Prior Publication Data

US 2003/0223866 A1 Dec. 4, 2003

(51) Int. Cl.$^7$ ................................................ F01D 11/00
(52) U.S. Cl. ..................... 415/112; 415/174.2; 277/375; 277/372
(58) Field of Search ................................ 415/110, 111, 415/112, 113, 168.1, 168.2, 170.1, 174.4, 174.2, 174.3, 230, 231; 277/348, 352, 375, 390, 372

(56) References Cited

U.S. PATENT DOCUMENTS

| | | | |
|---|---|---|---|
| 3,897,957 A | * | 8/1975 | Warner ........................ 277/373 |
| 4,420,160 A | | 12/1983 | Laham |
| 4,451,048 A | | 5/1984 | Pick |
| 5,211,536 A | | 5/1993 | Ackerman et al. |
| 5,755,817 A | * | 5/1998 | Prouty et al. ................ 415/112 |
| 6,318,958 B1 | | 11/2001 | Giesler et al. |

* cited by examiner

Primary Examiner—Edward K. Look
Assistant Examiner—Dwayne J. White
(74) Attorney, Agent, or Firm—Robert Desmond, Esq.

(57) ABSTRACT

One or more stator seal assemblies are mounted in the housing of a rotating machine such as, for example, an air turbine starter for a gas turbine engine, and surround a rotating shaft. The seal assemblies each include a seal case and a seal. The seal has a face that engages an axial face of a face seal rotor to form a seal. One or more anti-rotation tabs in the seal case engage anti-rotation notches formed in the peripheral surface of the seal. The anti-rotation notches each include substantially arcuate sections formed in notch end surfaces. The arcuate sections increase the amount of wear in the notches that can be tolerated before a potential seal lock-up, thus increasing seal assembly lifetime.

28 Claims, 7 Drawing Sheets

INCREASED WEAR-LIFE MECHANICAL FACE SEAL ANTI-ROTATION SYSTEM

FIELD OF THE INVENTION

The present invention relates to gas turbine engines and, more particularly, to a seal used in gas turbine engines, gas turbine engine starters, and auxiliary power units, that provides increased wear life compared to presently known seals.

BACKGROUND OF THE INVENTION

Many relatively large turbine engines, including turbofan jet engines, may use an air turbine starter (ATS) to initiate their rotation. The ATS is mounted by the jet engine, much as a starter for an automobile is located by the automobile's engine. The ATS may be coupled to a high pressure fluid source, such as compressed air, which impinges upon the turbine wheel in the ATS causing it to rotate at a relatively high rate of speed. The ATS includes an output shaft that is coupled, perhaps via one or more gears, to the jet engine. The output shaft rotation in turn causes the jet engine to begin rotating. The applicant for the present invention, Honeywell International, Inc., has for years successfully designed, developed and manufactured ATSs.

The ATS turbine wheel output shaft may be rotationally mounted within a housing using one or more bearing assemblies. The bearing assemblies, as well as the above noted gears, may be supplied with a lubricant, such as oil. Thus, the ATS may be mounted within a housing that is divided into at least two sections, the turbine section and the output section. The turbine section houses the turbine wheel and includes one or more passages through which the high pressure fluid source passes and impinges upon the turbine wheel, causing the turbine wheel to rotate. The output section may house the turbine wheel output shaft, the gears, the bearing assemblies, and various other mechanical devices that utilize a lubricant. A seal assembly may be provided between the turbine section and output section of the ATS to substantially inhibit the lubricant used in output section from leaking out of the output section into the turbine section.

The seal assembly may be a face seal that includes a rotor, a seal ring, and a seal case. The rotor is mounted on the turbine wheel output shaft and, thus, rotates with the output shaft, and has an axially facing flange that extends radially away from shaft. The seal case is mounted to the ATS housing in the turbine section and surrounds the turbine wheel output shaft. The seal ring is housed within the seal case and sealingly engages the axially facing flange of the rotor. To inhibit the seal ring from rotating with the rotor, the seal ring may include one or more anti-rotation notches, and the seal case may include one or more anti-rotation tabs, which are inserted into the ant-rotation notches.

The above-described anti-rotation tabs on the seal case may, under certain circumstances, wear into the sides of anti-rotation notches in the stator ring and form a wear groove. As shown more clearly in FIG. 11, this wear groove 1102 may eventually form a circumferential face 1104 in the side of the stator ring anti-rotation notch 1106, forming an edge or corner 1108 between the wear groove circumferential face 1104 and the circumferential end face 1112 of the stator ring anti-rotation notch 1106. The stator case anti-rotation tab 1114 may contact the edge 1108 formed in the anti-rotation notch 1106, which can lock the seal ring 1116 in the axial direction, and result in leakage between the turbine section and the outside environment. This leakage can result in sufficient loss of lubrication to the bearings, gears, and other lubricated components in the air turbine starter gearbox to cause damage to these components. It should be appreciated that ATS's with the above design are nonetheless safe for their intended use.

Hence, there is a need for a seal assembly that reduces the likelihood of lock-up between the seal anti-rotation notches and seal case anti-rotation tabs due to wear groove formation in the anti-rotation notches, thereby reducing the likelihood of loss of lubrication to rotating components within the starter gearbox. The present invention addresses this need.

SUMMARY OF THE INVENTION

The present invention provides a seal assembly that reduces the likelihood of lock-up between the anti-rotation notches formed in the seal and the anti-rotation tabs formed in the seal case.

In one embodiment of the present invention, and by way of example only, an air turbine starter includes a housing, a turbine wheel, a seal rotor, a seal case, at least one anti-rotation tab, a seal, and at least one anti-rotation notch. The housing has a fluid inlet port, a fluid outlet port, and a fluid flow passage extending therebetween. The turbine wheel has a turbine shaft rotationally mounted within the housing, and at least two turbine blades extending radially into the fluid flow passage. The seal rotor is mounted on the turbine shaft and has an axially facing flange extending radially away from the turbine shaft. The seal case is mounted on the housing and surrounds the turbine shaft, and has an inner surface and an outer surface. Each anti-rotation tab extends from the seal case inner surface. The seal is mounted within the seal case and has a first face, a second face, and an outer peripheral surface extending therebetween. The first face sealingly engages the axially facing flange. Each anti-rotation notch is formed in the seal outer peripheral surface and receives an anti-rotation tab therein. Each anti-rotation notch has at least two side surfaces and an end surface, with the end surface having at least first and second arcuate portions formed substantially symmetric about an axis that intersects the anti-rotation notch.

In another exemplary embodiment, a seal assembly includes a seal case, at least one anti-rotation tab, a seal, and at least one anti-rotation notch. The seal case has an inner surface and an outer surface. Each anti-rotation tab extends from the seal case inner surface. The seal is mounted within the seal case and has a first face, a second face, and an outer peripheral surface extending therebetween. Each anti-rotation notch is formed in the seal outer peripheral surface and receives an anti-rotation tab therein. Each anti-rotation notch has at least two side surfaces and an end surface, with the end surface having at least first and second arcuate portions formed substantially symmetric about an axis that intersects the anti-rotation notch.

In yet another exemplary embodiment, in an air turbine starter including a housing, a turbine wheel having a turbine shaft rotationally mounted within the housing, a seal rotor mounted on the turbine shaft, and a stator seal assembly mounted to the housing and surrounding the shaft and having at least a portion thereof sealingly engaging a face of the seal rotor, a method of modifying the air turbine starter includes removing the stator seal assembly from the turbine housing, and mounting a new stator seal assembly on the turbine housing. The new stator seal assembly includes a seal case, at least one anti-rotation tab, a seal, and at least one anti-rotation notch. The seal case has an inner surface and an outer surface. Each anti-rotation tab extends from the seal case inner surface. The seal is mounted within the seal case and has a first face, a second face, and an outer peripheral surface extending therebetween. Each anti-rotation notch is formed in the seal outer peripheral surface and receives an anti-rotation tab therein. Each anti-rotation notch has at least two side surfaces and an end surface, with the end surface having at least first and second arcuate portions formed substantially symmetric about an axis that intersects the anti-rotation notch.

In other aspects of the present invention, one or more of the above elements can be used in a gas turbine engine.

Other independent features and advantages of the preferred seal assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it should be appreciated that the present invention is not limited to use in conjunction with a specific type of rotating machine. Thus, although the present invention is, for convenience of explanation, depicted and described as being implemented in an air turbine starter, it should be appreciated that it can be implemented in numerous other rotating machines including, but not limited to, a gas turbine engine, a hydraulic pump, a water pump, or various other chemical and industrial pumps.

Figure 1:
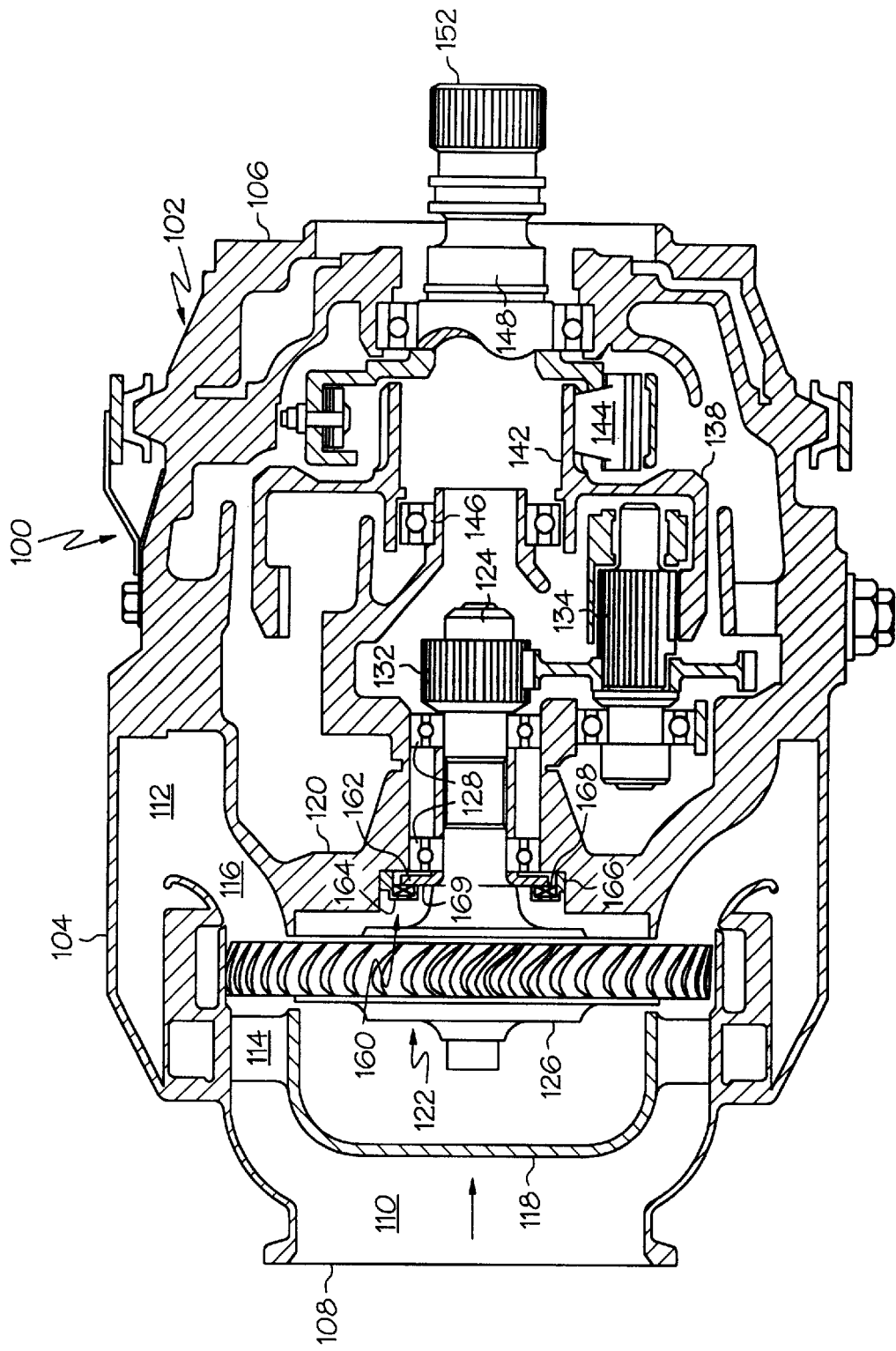
FIG. 1 is a cross section view of an air turbine starter that may use the seal assembly of the present invention.

Turning now to the description, a cross section view of an exemplary air turbine starter (ATS) that is used to initiate the rotation of a larger turbine, such as a turbofan jet engine, is depicted in FIG. 1. The ATS 100 is enclosed within a housing assembly 102 that includes at least a turbine section 104 and an output section 106. The housing assembly 102 may be made up of two or more parts that are combined together or may be integrally formed as a single piece. The housing assembly 102 includes an inlet plenum 108, which directs compressed air into the housing assembly 102. The compressed air received at the plenum 108 flows through an annular flow passage 110 and out a radial outlet port 112. The annular flow passage includes an axial flow portion 114 and a substantially curved radial flow portion 116. The axial flow portion 114 is formed through a stator assembly 118 that is mounted within the housing assembly turbine section 104 proximate the fluid inlet port 108. The radial flow portion 116, which flares the annular flow passage 110 radially outwardly, is formed between a portion of the housing assembly turbine section and an exhaust housing 120 that is mounted within the housing assembly 102.

A turbine wheel 122 is rotationally mounted within the housing assembly turbine section 104. In particular, the turbine wheel 122 has an output shaft 124 that extends from a hub 126, through the exhaust housing 120, and into the housing assembly output section 106. The turbine wheel output shaft 124 is rotationally mounted in the housing assembly output section 106 by bearing assemblies 128. A gear 132 is coupled to the turbine wheel output shaft 124, and meshes with a compound planetary gear train 134. The compound planetary gear train 13 engages a ring gear 138 and a hub gear 142, which is in turn coupled to an overrunning clutch 144. During operation of the ATS 100, this gearing configuration converts the high speed, low torque output of the turbine wheel output shaft 124 into low speed, high torque input for the overrunning clutch 144.

The overrunning clutch 144, as noted above, is coupled to the hub gear 142, which is supported by another bearing assembly 146. A drive shaft 148 extends from the overrunning clutch 144, through the turbine housing output section 106, and is coupled to a turbine output shaft 152. The output shaft 152 may be coupled to, for example, a turbofan jet engine gearbox (not illustrated).

A face seal assembly 160 provides a fluid tight seal between the rotating turbine wheel 126 and the oil held inside of the housing assembly turbine section 104 and the housing assembly output section 106. The face seal assembly 160 includes a rotor 162, and a stator seal assembly 164 that includes a seal case 166 and a seal stator ring 168. The rotor 162 is mounted on the turbine wheel output shaft 124, and has an axially facing flange 169 that extends radially outwardly away from the turbine wheel output shaft 124. The seal case 166 is mounted to the exhaust housing 120 and surrounds the turbine wheel output shaft 124. The seal stator ring 168 is housed within the seal case 166 and sealingly engages the axially facing flange 169 of the rotor 162, providing the fluid tight seal between the rotating turbine wheel output shaft 124 and the oil held inside of the turbine housing 104 and output 106 sections. Though not explicitly depicted, it should be appreciated that another face seal assembly 160 may also be included in the ATS 100 that seals the turbine output shaft 152.

Figure 2:
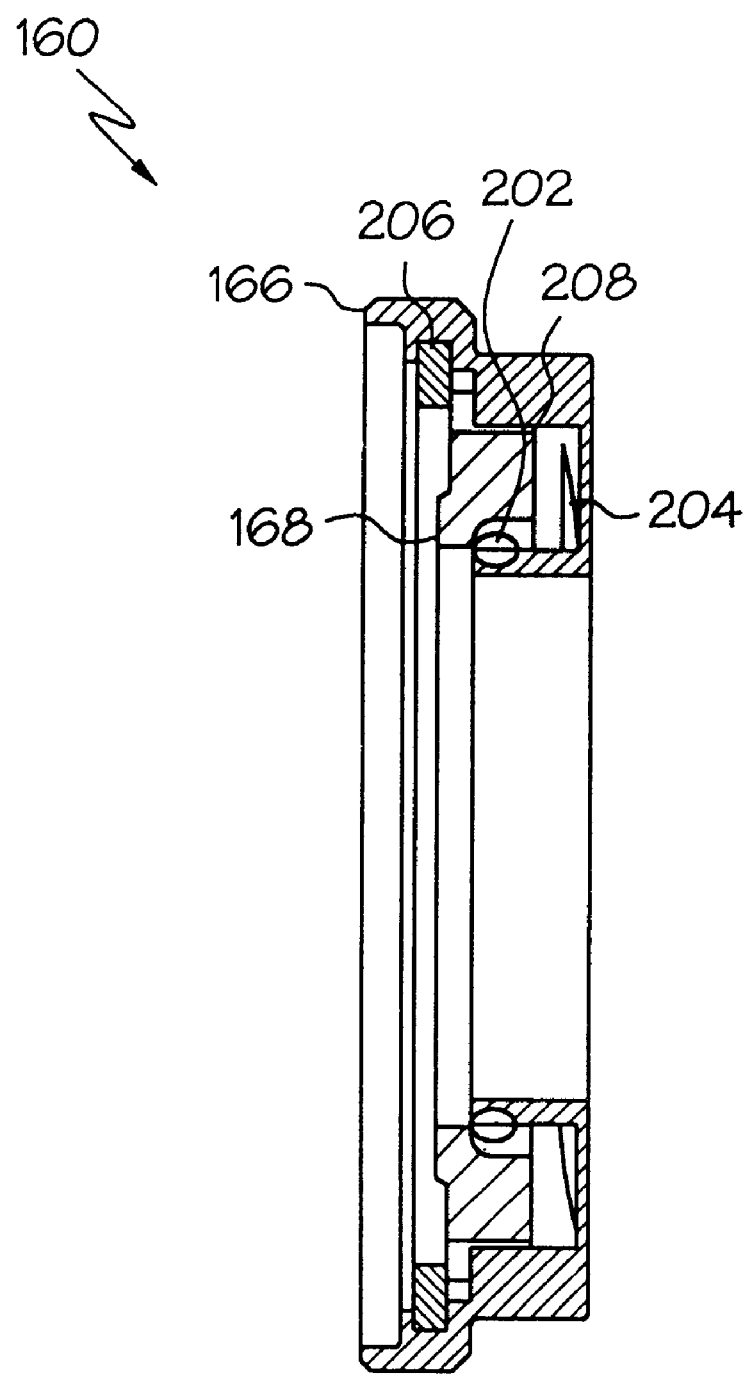
FIG. 2 is a stator seal assembly according to an exemplary embodiment of the present invention.
Figure 3:
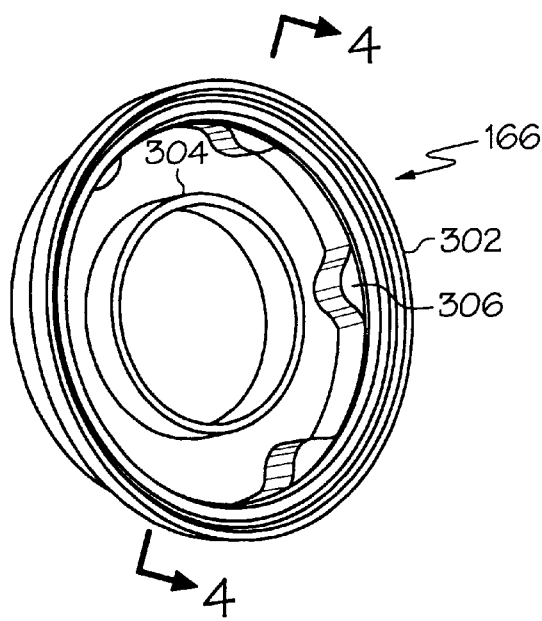
FIG. 3 is a perspective view of an exemplary seal case that may form part of the stator seal assembly depicted in FIG. 2.
Figure 4:
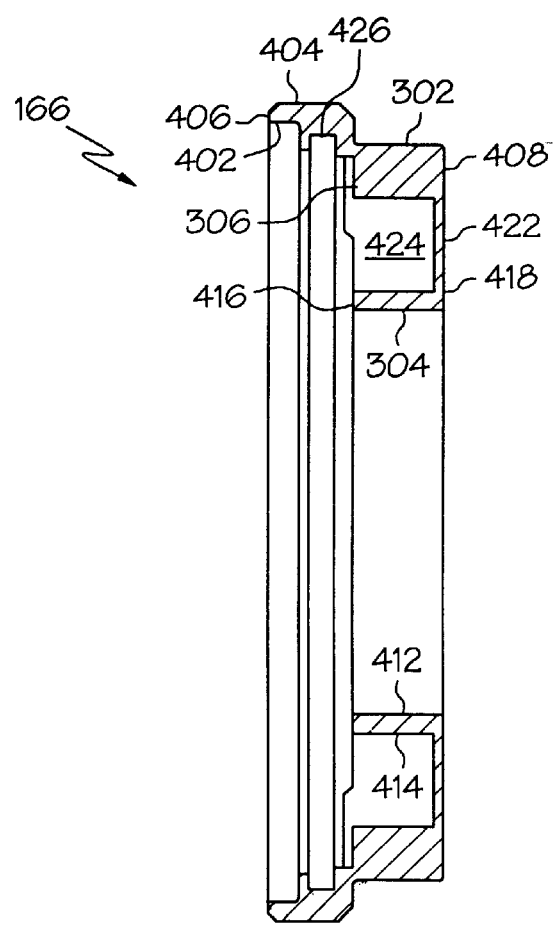
FIG. 4 is a cross section view of the seal case taken along line 4—4 in FIG. 3.
Figure 5:
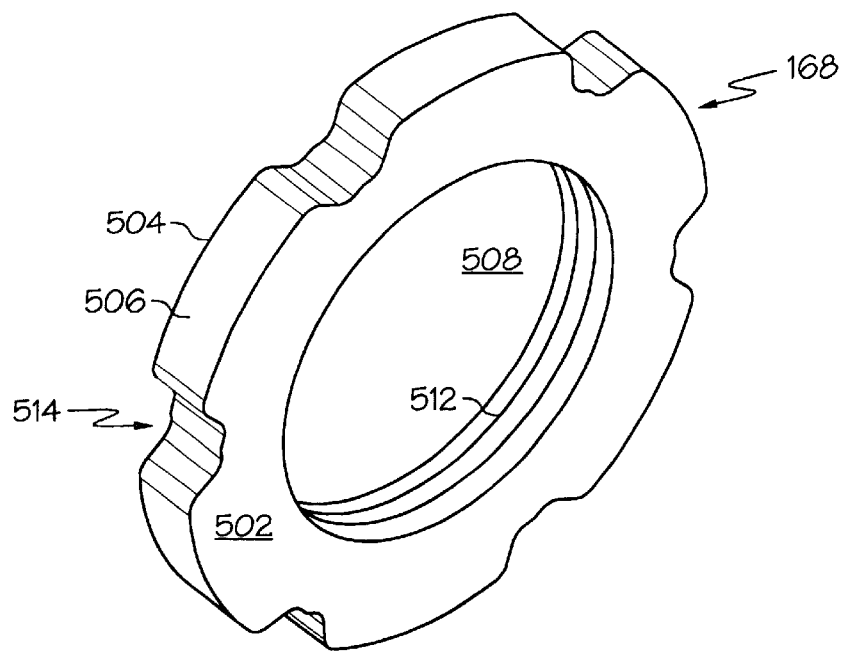
FIG. 5 is a perspective view of an exemplary seal that may form part of the stator seal assembly.
Figure 6:
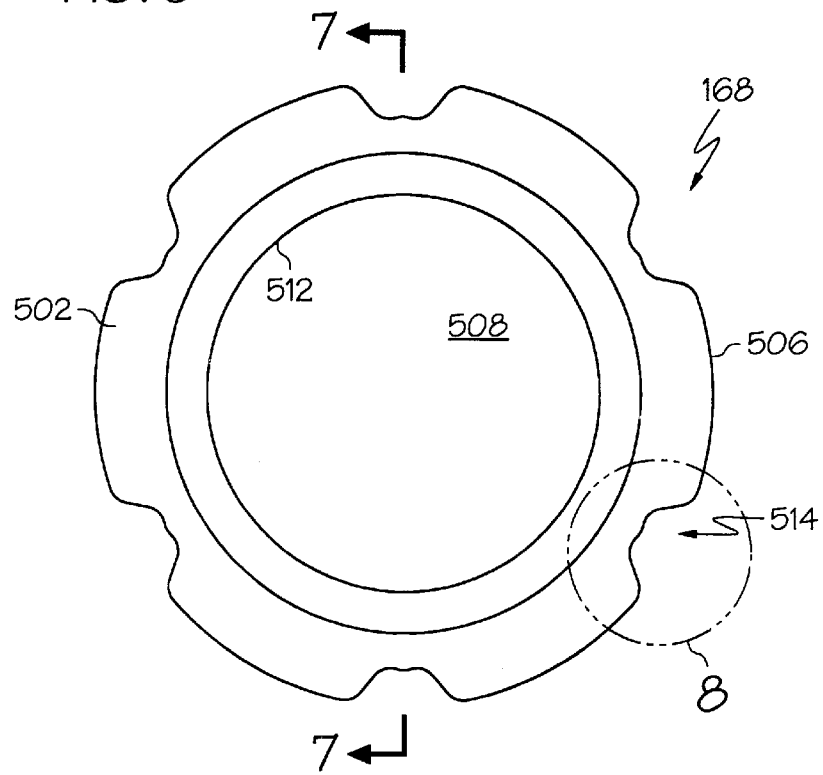
FIG. 6 is a front view of the exemplary seal depicted in FIG. 5.
Figure 7:
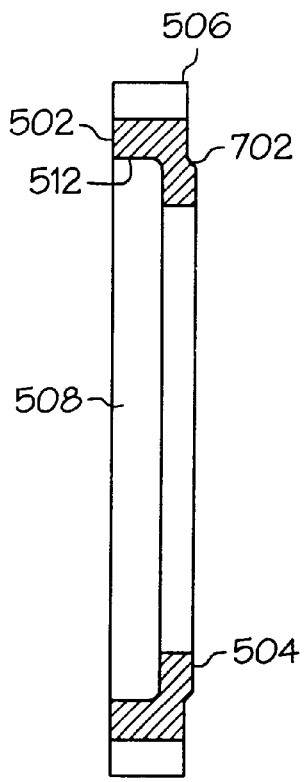
FIG. 7 is a cross section view of the exemplary seal taken along line 7—7 in FIG. 6.
Figure 8:
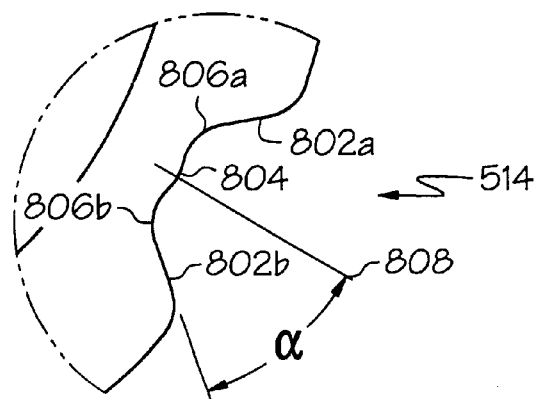
FIG. 8 is a close-up view of one of the anti-rotation notches according to an exemplary embodiment of the present invention.

Turning now to FIGS. 2–9, a more detailed description of a particular embodiment of the stator seal assembly 160 and the components that make it up will be provided. The stator seal assembly 160, shown in cross section in FIG. 2, includes the seal case 166, the seal stator ring 168, an O-ring 202, a spring washer 204, a retaining ring 206, and may additionally include a seal washer 208. The seal case 166, which is depicted in perspective and cross section views, respectively, in FIGS. 3 and 4, is generally annular in shape and, in the depicted embodiment, is formed from two substantially annular hubs, a first hub 302 and a second hub 304. The first hub 302 surrounds the second hub 304, and includes an inner surface 402, an outer surface 404, a first end 406, and a second end 408. Similarly, the second hub 304 includes an inner surface 412, an outer surface 414, a first end 416, and a second end 418. As FIG. 2 illustrates, the O-ring 202 is mounted on the second hub outer surface 414. A substantially flat radial end wall 422 couples the first hub second end 408 to the second hub second end 418, forming an annulus 424 between the second hub outer surface 414 and a portion of the first hub inner surface 402. As depicted in FIG. 2, the spring washer 204 is inserted in the annulus 424 and exerts an axial force on the seal stator ring 168. One or more anti-rotation tabs 306 are formed on, and extend radially inwardly from, the first hub inner surface 402. As will be described more fully below, each anti-rotation tab 306 is inserted into an anti-rotation notch that is formed in the seal stator ring 168. In addition, a groove 426 is formed in the first hub inner surface 402. The retaining ring 206, as illustrated in FIG. 2, is inserted into the groove 426 and holds the seal stator ring 168 in place within the seal case 166 against the axial force of the spring washer 204.

The seal stator ring 168, a preferred embodiment of which is depicted in FIGS. 5–8, is substantially annular in shape and has a first face 502, a second face 504, an outer peripheral surface 506, and a central opening 508 extending between the first 502 and second 504 faces that forms an inner peripheral surface 512. As shown more clearly in FIG. 7, an annular flange surface 702 is formed on the seal inner peripheral surface 512. Turning briefly back to FIG. 2, it can be seen that in addition to being mounted on the second hub outer surface 414, the O-ring 202 rests against the annular flange surface 702.

Returning now to FIGS. 5–8, one or more anti-rotation notches 514 are formed in the seal outer peripheral surface 506. As noted above, each anti-rotation notch 514 receives one of the anti-rotation tabs 306 formed on the first hub inner surface 402, inhibiting rotational movement of the seal stator ring 168. Each anti-rotation notch 514, as shown more clearly in FIG. 8, includes at least two side surfaces 802a and 802b and an end surface 804. The end surface 804 is formed of at least two arcuate sections, a first arcuate section 806a and a second arcuate section 806b. The first 806a and second 806b arcuate sections are formed substantially symmetric about an axis 808 that intersects the anti-rotation notch 514, and extend from the axis 808 at a predetermined angle (α). In the depicted embodiment, the axis 808 bisects the anti-rotation notch 514.

Figure 9:
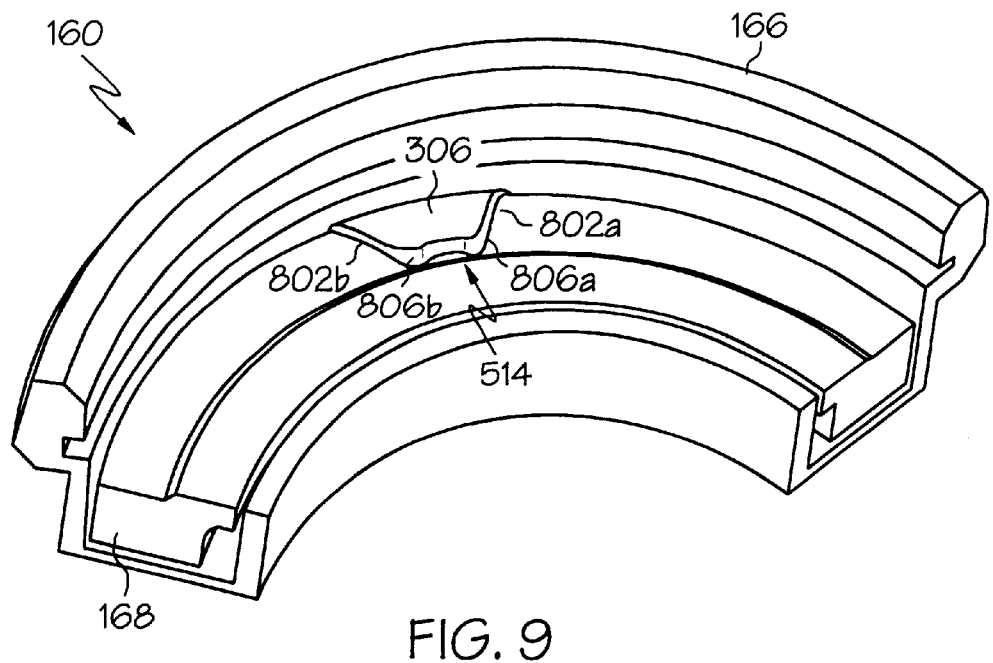
FIG. 9 is a perspective view of a portion of the exemplary stator seal assembly depicted in FIG. 2.
Figure 11:
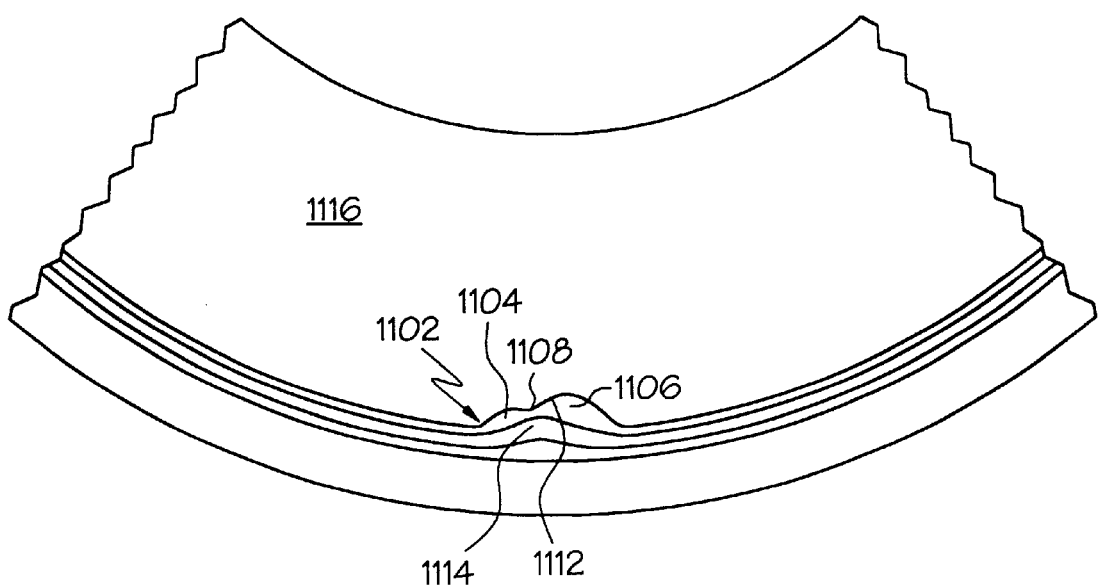
FIG. 11 is a close-up view of a conventionally known seal ant-rotation notch configuration.

With reference now to FIG. 9, when the stator seal assembly 160 is assembled and installed in a rotating machine such as, for example, the ATS 100, the anti-rotation tabs 306 will contact one of the sides 802a, b of the anti-rotation notches 514, depending upon the relative direction of rotation of the machine. As with the conventional seal assembly depicted in FIG. 11, this contact between the anti-rotation tabs 306 and the sides 802a, b of the anti-rotation notches 514 will form a wear groove in the anti-rotation notches 514. However, by providing the first 806a and second 806b arcuate sections in the notch end surface 804, increases the amount of wear before an edge or corner, that may axially lock the seal stator ring 168, is formed in the notch 514. Indeed, in one particular preferred embodiment, analysis has shown a ten-fold increase in operational cycles of an ATS 100 before this type of failure mode occurs.

Figure 10:
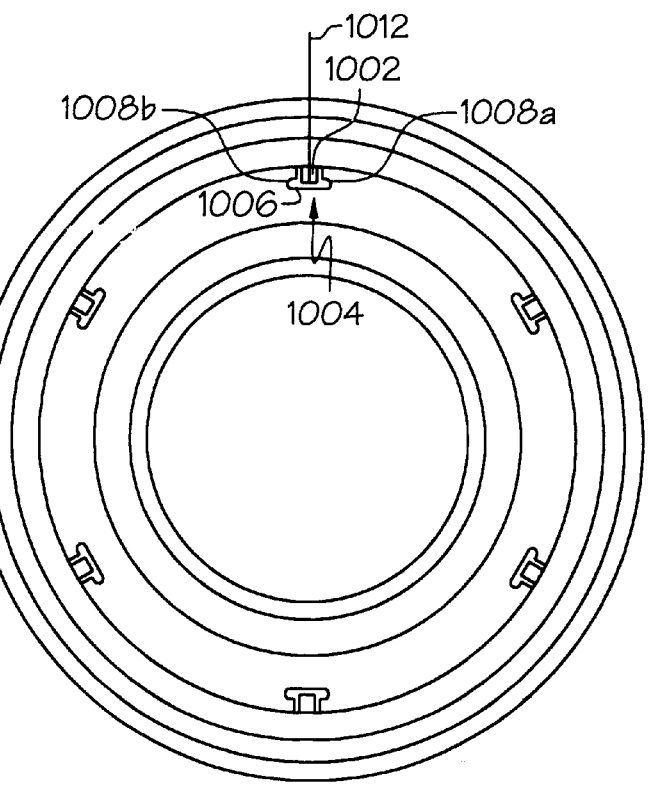
FIG. 10 is a close up view of an alternative embodiment according to the present invention.

Turning now to FIG. 10, an alternate embodiment of the present invention is depicted. In this embodiment, the anti-rotation tabs 1002 and anti-rotation notches 1004 are configured slightly differently. In particular, rather having sides with generally angular slopes, the sides of the anti-rotation tabs 1002 and anti-rotation notches 1004 are substantially perpendicularly situated. As with the previous embodiment, the end surface 1006 of the anti-rotation notch 1004 includes first 1008a and second 1008b arcuate sections formed substantially symmetric about an axis 1012 that intersects the anti-rotation notch 1004. However, with this embodiment, the first and second arcuate sections 1008a, b extend substantially perpendular to the axis 1012 (e.g., the predetermined angle, α, is 90-degrees).

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An air turbine starter, comprising:

a housing having a fluid inlet port, a fluid outlet port, and a fluid flow passage extending therebetween;

a turbine wheel having a turbine shaft rotationally mounted within the housing, the turbine wheel further having at least two turbine blades extending radially into the fluid flow passage;

a seal rotor mounted on the turbine shaft, the seal rotor having an axially facing flange extending radially away from the turbine shaft;

a seal case mounted on the housing and surrounding the turbine shaft, the seal case having an inner surface and an outer surface;

at least one anti-rotation tab extending from the seal case inner surface;

a seal mounted within the seal case, the seal having a first face, a second face, and an outer peripheral surface extending therebetween, the first face engaging the axially facing flange; and at least one anti-rotation notch formed in the seal outer peripheral surface and receiving an anti-rotation tab therein, each anti-rotation notch having at least two side surfaces and an end surface, the end surface having at least first and second arcuate portions formed substantially symmetrically about an axis that intersects the anti-rotation notch.

2. The air turbine starter of claim 1, wherein the seal case comprises:

a first hub having a first end, a second end, an inner surface, and an outer surface;

a second hub having a first end, a second end, an inner surface, and an outer surface, the first hub surrounding the second hub; and a substantially flat radial end wall coupling the first hub second end to the second hub second end, thereby forming an annulus between the second hub outer surface and at least a portion of the first hub inner surface, wherein the anti-rotation tabs are formed on the first hub inner surface and extend into the annulus.

3. The air turbine starter of claim 2, further comprising:

a spring washer positioned within the annulus and exerting an axial force against the second face of the seal.

4. The air turbine starter of claim 3, further comprising:
a groove formed on the first hub inner surface proximate the first hub first end; and
a retaining ring having at least a portion thereof positioned in the groove.

5. The air turbine starter of claim 3, further comprising:
a substantially flat seal washer positioned between the spring washer and the seal second face.

6. The air turbine starter of claim 2, further comprising:
an O-ring seal coupled around the second hub outer surface.

7. The air turbine starter of claim 6, wherein the seal further comprises:
a central opening extending between the first and second faces, forming an inner peripheral surface; and
an annular flange surface formed on the seal inner peripheral surface,
wherein at least a portion of the O-ring seal contacts the annular flange surface.

8. The air turbine starter of claim 1, wherein the first and second arcuate portions extend away from the axis at a predetermined angle.

9. The air turbine starter of claim 8, wherein the predetermined angle is 90-degrees.

10. A seal assembly, comprising:
a seal case having an inner surface and an outer surface;
at least one anti-rotation tab extending from the seal case inner surface;
a seal mounted within the seal case, the seal having a first face, a second face, and an outer peripheral surface extending therebetween; and
at least one anti-rotation notch formed in the seal outer peripheral surface and receiving an anti-rotation tab therein, each anti-rotation notch having at least two side surfaces and an end surface, the end surface having at least first and second arcuate portions formed substantially symmetric about an axis that intersects the anti-rotation notch.

11. The seal assembly of claim 10, wherein the seal case comprises:
a first hub having a first end, a second end, an inner surface, and an outer surface;
a second hub having a first end, a second end, an inner surface, and an outer surface, the first hub surrounding the second hub; and
a substantially flat radial end wall coupling the first hub second end to the second hub second end, thereby forming an annulus between the second hub outer surface and at least a portion of the first hub inner surface,
wherein the anti-rotation tabs are formed on the first hub inner surface and extend into the annulus.

12. The seal assembly of claim 11, further comprising:
a spring washer positioned within the annulus and exerting an axial force against the second face of the seal.

13. The seal assembly of claim 12, further comprising:
a groove formed on the first hub inner surface proximate the first hub first end; and
a retaining ring having at least a portion thereof positioned in the groove.

14. The seal assembly of claim 12, further comprising:
a substantially flat seal washer positioned between the spring washer and the seal second face.

15. The seal assembly of claim 11, further comprising:
an O-ring seal coupled around the second hub outer surface.

16. The seal assembly of claim 15, wherein the seal further comprises:
a central opening extending between the first and second faces, forming an inner peripheral surface; and
an annular flange surface formed on the seal inner peripheral surface,
wherein at least a portion of the O-ring seal contacts the annular flange surface.

17. The seal assembly of claim 10, wherein the first and second arcuate portions extend away from the axis at a predetermined angle.

18. The seal assembly of claim 17, wherein the predetermined angle is 90-degrees.

19. In air turbine starter including a housing, a turbine wheel having a turbine shaft rotationally mounted within the housing, a seal rotor mounted on the turbine shaft, and a stator seal assembly mounted to the housing and surrounding the shaft and having at least a portion thereof sealingly engaging a face of the seal rotor, a method of modifying the air turbine starter, the method comprising:
removing the stator seal assembly from the turbine housing; and
mounting a new stator seal assembly on the turbine housing,
wherein the new stator seal assembly includes:
a seal case having an inner surface and an outer surface,
at least one anti-rotation tab extending from the seal case inner surface,
a seal mounted within the seal case, the seal having a first face, a second face, and an outer peripheral surface extending therebetween, and
at least one anti-rotation notch formed in the seal outer peripheral surface and receiving an anti-rotation tab therein, each anti-rotation notch having at least two side surfaces and an end surface, the end surface having at least first and second arcuate portions formed substantially symmetric about an axis that intersects the anti-rotation notch.

20. The method of claim 19, wherein the seal assembly further comprises:
an O-ring seal coupled around the second hub outer surface.

21. The method of claim 19, wherein the seal case comprises:
a first hub having a first end, a second end, an inner surface, and an outer surface;
a second hub having a first end, a second end, an inner surface, and an outer surface, the first hub surrounding the second hub; and
a substantially flat radial end wall coupling the first hub second end to the second hub second end, thereby forming an annulus between the second hub outer surface and at least a portion of the first hub inner surface,
wherein the anti-rotation tabs are formed on the first hub inner surface and extend into the annulus.

22. The method of claim 21, wherein the seal assembly further comprises:
a spring washer positioned within the annulus and exerting an axial force against the second face of the seal.

23. The method of claim 22, wherein the seal assembly further comprises:
a groove formed on the first hub inner surface proximate the first hub first end; and a retaining ring having at least a portion thereof positioned in the groove.

24. The method of claim 22, wherein the seal assembly further comprises:

a substantially flat seal washer positioned between the spring washer and the seal second face.

25. The method of claim 19, wherein the seal further comprises:

a central opening extending between the first and second faces, forming an inner peripheral surface; and an annular flange surface formed on the seal inner peripheral surface, wherein at least a portion of the O-ring seal contacts the annular flange surface.

26. The method of claim 25, wherein the first and second arcuate portions extend away from the axis at a predetermined angle.

27. The method of claim 26, wherein the predetermined angle is 90-degrees.

28. A gas turbine engine, comprising:

a housing having a fluid inlet port, a fluid outlet port, and a fluid flow passage extending therebetween;

a turbine wheel having a turbine shaft rotationally mounted within the housing, the turbine wheel further having at least two turbine blades extending radially into the fluid flow passage;

a seal rotor mounted on the turbine shaft, the seal rotor having an axially facing flange extending radially away from the turbine shaft;

a seal case mounted on the housing and surrounding the turbine shaft, the seal case having an inner surface and an outer surface;

at least one anti-rotation tab extending from the seal case inner surface;

a seal mounted within the seal case, the seal having a first face, a second face, and an outer peripheral surface extending therebetween, the first face engaging the axially facing flange; and at least one anti-rotation notch formed in the seal outer peripheral surface and receiving an anti-rotation tab therein, each anti-rotation notch having at least two side surfaces and an end surface, the end surface having at least first and second arcuate portions formed substantially symmetrically about an axis that intersects the anti-rotation notch.

* * * * *